US006994452B2

(12) United States Patent
Rozenberg et al.

(10) Patent No.: US 6,994,452 B2
(45) Date of Patent: Feb. 7, 2006

(54) LAMPS, LUMINAIRES AND LIGHTING SYSTEMS

(76) Inventors: Simon Grant Rozenberg, The Bothy House, Mentmore, Buckinghamshire LU7 0QG (GB); Ian Shaun Lawry, 18 Meteor Close, Woodley, Berkshire RG5 4NG (GB); George Alan Limpkin, 22 Hayes Mead, Ciltern Park, Berkhamstead, Hertfordshire HP14 1BU (GB)

( * ) Notice: Subject to any disclaimer, the term of this patent is extended or adjusted under 35 U.S.C. 154(b) by 84 days.

(21) Appl. No.: 10/362,653

(22) PCT Filed: Aug. 24, 2001

(86) PCT No.: PCT/GB01/03814

§ 371 (c)(1),
(2), (4) Date: Jun. 4, 2003

(87) PCT Pub. No.: WO02/16826

PCT Pub. Date: Feb. 28, 2002

(65) Prior Publication Data
US 2004/0062055 A1 Apr. 1, 2004

(30) Foreign Application Priority Data
Aug. 24, 2000 (GB) .................................. 0020766

(51) Int. Cl.
*F21S 13/14* (2006.01)
(52) U.S. Cl. ...................... 362/252; 362/216; 362/540; 362/545; 362/800

(58) Field of Classification Search .................. 315/86; 362/20, 86, 146, 152, 212, 216, 227, 228, 362/240, 244, 260, 276, 278, 307, 334, 347, 362/800, 802, 252, 540, 545; 340/815.45, 340/815.53, 815.54
See application file for complete search history.

(56) References Cited

U.S. PATENT DOCUMENTS

| 4,435,743 | A | * | 3/1984 | Plumly ........................ 362/20 |
| 4,677,533 | A | * | 6/1987 | McDermott et al. ........ 362/240 |
| 4,682,147 | A | * | 7/1987 | Bowman ............... 340/815.45 |
| 4,929,866 | A |   | 5/1990 | Murata et al. |

(Continued)

FOREIGN PATENT DOCUMENTS

DE          299 139 30 U1    12/1999

(Continued)

*Primary Examiner*—Stephen Husar
*Assistant Examiner*—Hargobind S. Sawhney
(74) *Attorney, Agent, or Firm*—Buckley, Maschoff & Talwalkar LLC

(57) ABSTRACT

The invention relates to LED-based lamps, luminaires and lighting systems for buildings particularly, though not exclusively, for providing emergency light in the event of power failure. In particular it provides a light-emitting diode lamp comprising a support (26) and an array of light emitting diodes (58) on the support, an optical axis (72) passing through the middle of the array (58) and diodes increasing in number and increasing in inclination with distance from the optical axis (72). It also provides a luminaire (24) comprising a lamp as described above and a lens (30) having facets for generally un-deviated and un-reflected passage of light from off-axis diodes, and a building emergency lighting system comprising luminaires (24) as described above. In an alternative embodiment inclination of the light is through progressively increasing inclination of the facets.

24 Claims, 19 Drawing Sheets

U.S. PATENT DOCUMENTS

| | | |
|---|---|---|
| 4,935,665 A | 6/1990 | Murata |
| 4,963,798 A * | 10/1990 | McDermott ................ 315/312 |
| 4,984,999 A | 1/1991 | Leake |
| 5,303,124 A | 4/1994 | Wrobel |
| 5,463,280 A | 10/1995 | Johnson |
| 5,495,157 A | 2/1996 | Lanzisera |
| 5,561,346 A | 10/1996 | Byrne |
| 5,567,036 A | 10/1996 | Theobald et al. |
| 5,575,459 A | 11/1996 | Anderson |
| 5,585,783 A * | 12/1996 | Hall .......................... 340/473 |
| 5,752,766 A * | 5/1998 | Bailey et al. ............... 362/250 |
| 5,782,553 A | 7/1998 | McDermott |
| 5,797,672 A | 8/1998 | Dobert |
| 5,797,673 A * | 8/1998 | Logan et al. ............... 362/234 |
| 5,838,247 A | 11/1998 | Bladowski |
| 5,847,550 A * | 12/1998 | Schie et al. ................. 323/222 |
| 5,899,557 A | 5/1999 | McDermott |
| 6,072,280 A | 6/2000 | Allen |
| 6,357,893 B1 * | 3/2002 | Belliveau .................... 362/285 |
| 6,693,556 B1 * | 2/2004 | Jones et al. ................. 340/907 |

FOREIGN PATENT DOCUMENTS

| | | | |
|---|---|---|---|
| FR | 2588109 A * | 4/1987 | |
| FR | 2 771 888 | 6/1999 | |
| WO | WO 98/33007 A1 | 7/1998 | |
| WO | WO 01/13034 A1 | 2/2001 | |

* cited by examiner

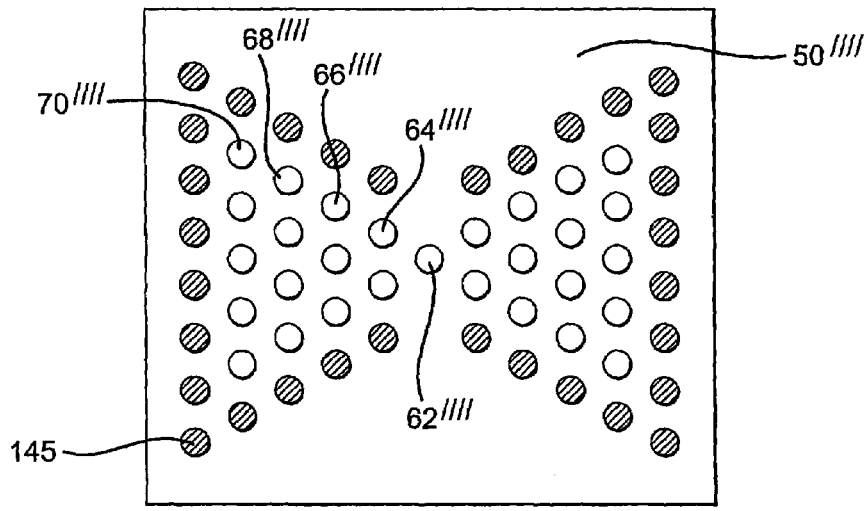
Fig.28
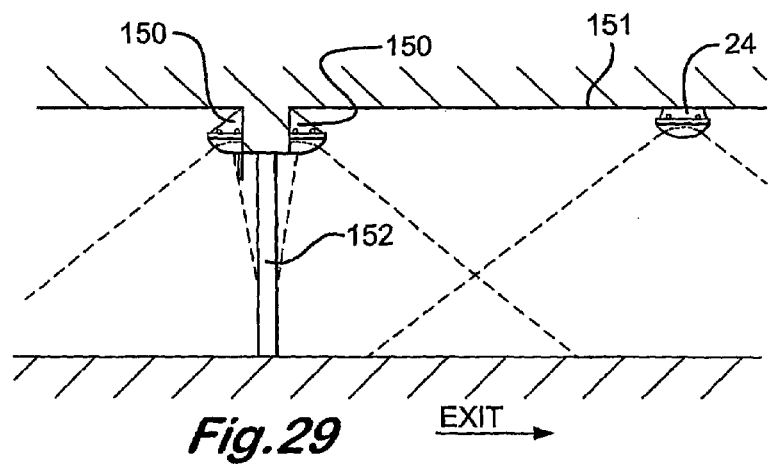
Fig.29 EXIT →
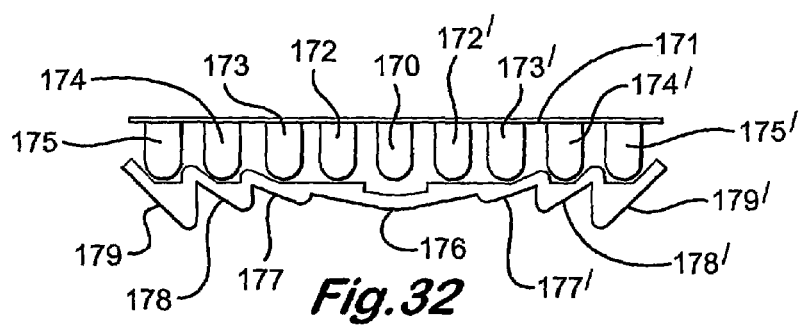
Fig.32

LAMPS, LUMINAIRES AND LIGHTING SYSTEMS

FIELD OF THE INVENTION

The present invention relates to lamps, luminaires and lighting systems for buildings particularly, though not exclusively, for providing emergency light in the event of power failure.

BACKGROUND TO THE INVENTION

Building emergency lighting for use in the event of power failure is a requirement for public buildings, for example department stores, offices, hospitals, museums, libraries, sporting facilities and the like. Such lighting is required to operate for an extended period by power from internal storage batteries that are put into use when the mains power supply fails. Despite their hunger for power and limited life, such lighting devices have up to now relied on incandescent lamps or fluorescent tubes. Light-emitting diodes (LED's) have low power consumption and long life, but suggestions for their use for building lighting have been few, and the problem of emergency lighting of pathways and areas as opposed to individual signs has not been considered.

Battery powered LED arrays built into building exit signs are disclosed in U.S. Pat. No. 5,303,124. Although the LEDs can illuminate the exit sign, in the disclosed signs they do not have the capacity to provide emergency illumination over large areas of the building. Patents U.S. Pat. Nos. 5,575,459 and 5,463,280 disclose LED lamps for use in exit signs and based on linear arrays of LEDs.

There have been a variety of disclosures of LED-based lamps outside the emergency lighting field. LED-based light strings for Christmas trees are disclosed in U.S. Pat. Nos. 4,984,999 and 5,495,147. LED arrays for vehicle lamps are disclosed in U.S. Pat. Nos. 4,929,866 and 4,935,665. A lamp using LEDs and a concave reflector to provide a concentrated beam is disclosed in U.S. Pat. No. 5,782,553, but such proposals are not appropriate for building emergency lighting where the requirement is to provide large areas of evenly distributed intensity. U.S. Pat. No. 5,838,247 discloses arrays of LEDs to provide the circular lamps for traffic lights. U.S. Pat. No. 5,899,557 discloses LEDs feeding their light into a curved cylindrical lens for generating a controlled beam pattern which is elongated in a defined plane, e.g. for a marine light fitted to a buoy or marker. Light strings based on LEDs are disclosed in U.S. Pat. No. 6,072,280.

SUMMARY OF THE INVENTION

It is an object of the invention to provide improved lamps and luminaires that can be used to provide emergency lighting for areas of buildings.

In one aspect the invention provides a light-emitting diode lamp comprising a support and an array of light emitting diodes on the support, an optical axis passing through the middle of the array, wherein:

the diodes increase in number with distance from the optical axis; and the light from the diodes increases in inclination with distance from the optical axis.

The present invention further provides a light-emitting diode lamp comprising a support and an array of light emitting diodes on the support, an optical axis passing through the middle of the array and the diodes increasing in number and increasing in inclination with distance from the optical axis.

The invention also provides a luminaire comprising a lamp as described above and a lens having facets for generally un-deviated and un-reflected passage of light from off-axis diodes.

The invention further provides a building emergency lighting system comprising luminaires as described above.

The invention yet further provides a light-emitting diode lamp comprising a support and an array of light emitting diodes on the support, and control means for causing the lamp to operate in a first mode to provide emergency lighting and in a second mode to provide continuous security lighting and to operate at a first power during emergency lighting and at a second power less than the first power during security lighting.

BRIEF DESCRIPTION OF PREFERRED FEATURES

The lamp may be ceiling or wall-mounted and be used to provide various patterns of light on a floor, e.g.:

a single lobe facing away from the axis for use e.g. adjacent an opening in a wall;

first and second lobes facing in opposite directions away from the axis for use e.g. in a path through a room;

first and second lobes facing in opposite directions away from the axis along a first line and third and fourth lobes facing in opposite directions away from the axis along a second line directed at right angles to the first line for use at an intersection of two paths;

A circularly symmetrical pattern of light for general illumination.

The inclination of the light may result from passage of the light from diodes at progressively increasing distance from the axis through respective lens facets of progressively increasing inclination. Alternatively the inclination of the light may result from an increase in inclination of the diodes with distance from the optical axis.

In one construction, the support may be generally planar and the diodes may be carried on inclined faces forming part of the support. The support may be concave and the diodes may be carried or mounted on the inner face, or as in a preferred embodiment the support may be convex and the diodes may be on the outer face. The support may be of flexible PCB material e.g. a fiberglass-based thin PCB material.

The diodes are advantageously lensed with clear lenses and have an output in the form of a concentrated beam of angle of e.g. about ±25° with respect to their optical axes, although both larger and smaller values are possible. The LEDs should produce white light, as this is required for building emergency illumination.

The diodes are preferably at spacings one from another. Rather than using discrete lensed LEDs, it may, however, be possible to mount chip diodes on a PCB or other support and to subsequently overlay lenses e.g. in strips on the LEDs to give directional light output. The support advantageously carries an electrical circuit for supplying power to the diodes, the diodes being connected in parallel.

A luminaire according to the invention advantageously further comprises storage batteries for supplying current to the diodes, a charging circuit for charging the batteries from mains power and a control circuit for switching battery power to the diodes on loss of mains power. In a variant a luminaire according to the invention may contain within a single housing e.g. for mounting on or in a ceiling both a LED lamp as aforesaid and least one source of general light, e.g. at least one incandescent lamp or at least one fluorescent tube.

BRIEF DESCRIPTION OF THE DRAWINGS

Various embodiments of the invention will now be described, by way of example only with reference to the accompanying drawings, in which:

FIGS. 26–28 are diagrammatic views of further LED arrays;

FIG. 29 is a view of an opening in a wall of a building and associated luminaries for security/emergency lighting including luminaries for mounting adjacent to the opening, FIG. 32 is a view of a planar circuit board and fresnel lens for distributing light carried by the circuit board to the far field.

DETAILED DESCRIPTION OF PREFERRED EMBODIMENTS

Where the supply of normal lighting to premises fails, emergency lighting may be required, providing escape lighting that fulfils the following functions:
(a) indicating escape routes;
(b) providing illumination along such routes to allow safe movement towards and through exits;
(c) enabling fire alarm call points and fire fighting equipment provided along escape routes to be readily located.

Figure 1:
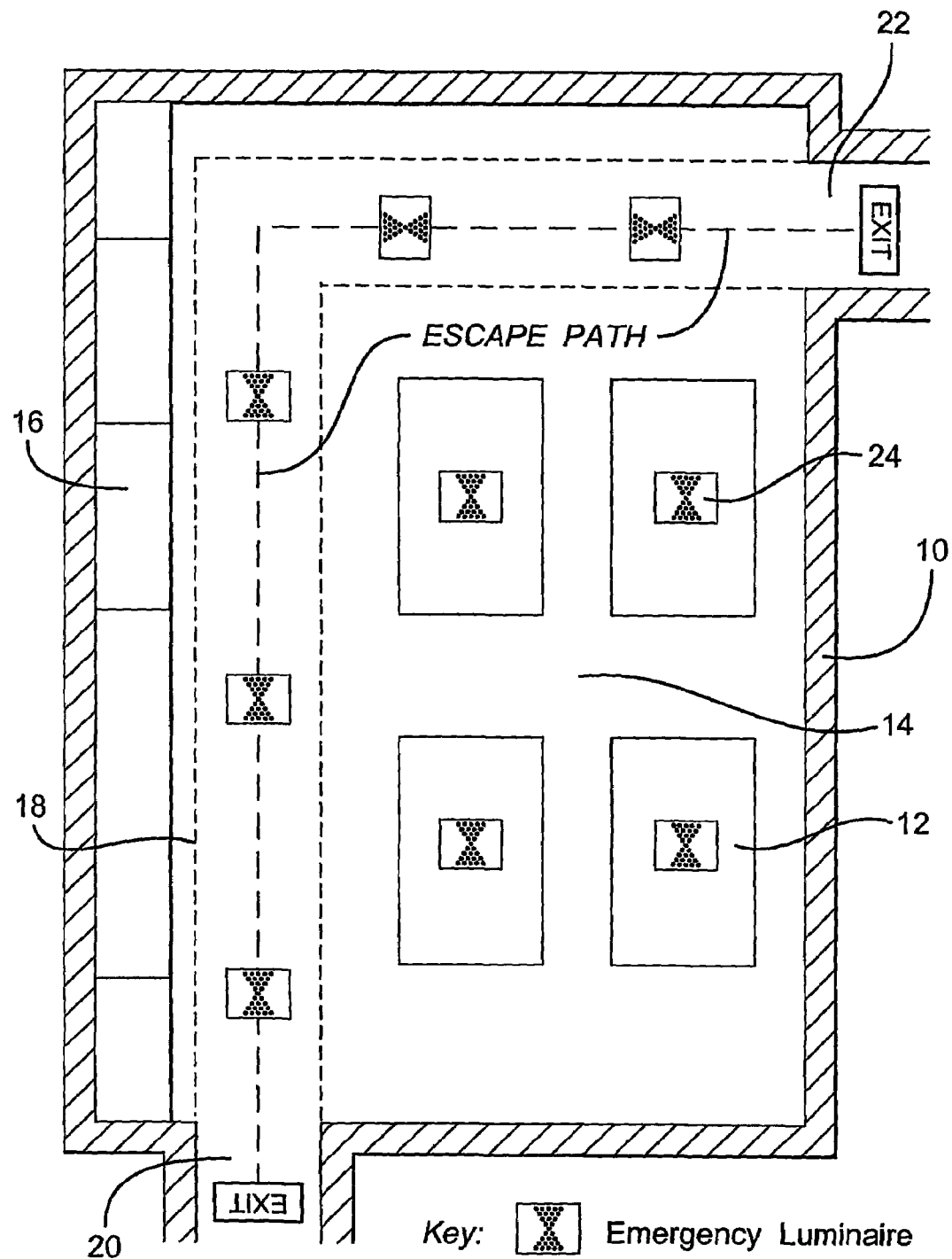
FIG. 1 is a diagrammatic plan view of a room in a department store showing an escape path along which luminaires according to a first embodiment of the invention are fitted as downlights.

In the drawings, FIG. 1 shows a sales space 10 of a department store having sales counters 12 in an area 14, storage facilities 16 and a path 18 between an entrance 20 and an exit 22. In ordinary circumstances, the path 18 serves as a walkway, but in the event of a power failure or other emergency it also serves as an escape path. Emergency lighting luminaires powered by storage batteries are used to light both the path 18 and other areas such as the sales area 14. British standards, for example BS 5266-1:1999 require an even illumination of 1.0 lux and of width at least 0.5 meter along the path 18 and illumination of 0.2 lux in other areas. Up to now such emergency illumination has been provided by luminaires that have incandescent or fluorescent lamps, and it is one of the objects of this invention to provide a luminaire for emergency lighting that takes advantage of the long life, high luminous efficiency and low power consumption of light-emitting diodes. Furthermore the luminaire of the invention can be provided in both non-maintained and in maintained versions, the maintained version being illuminatable as required to provide low-level security lighting e.g. for use overnight or at weekends when the main illumination is off so that for example security cameras can monitor the space which is being illuminated. When used for the purposes of security lighting, the LED's are preferably run at a reduced output compared to when they are run in emergency mode in order to preserve their life. Intelligent electronics built into the lamp can provide the security lighting and the emergency illumination modes of running the LEDs and can monitor the operation of the system and detect faults as will be described more fully below. The use of LED-based security lighting instead of security lighting based on incandescent or fluorescent lamps offers the possibility of achieving large energy savings.

Figure 2:
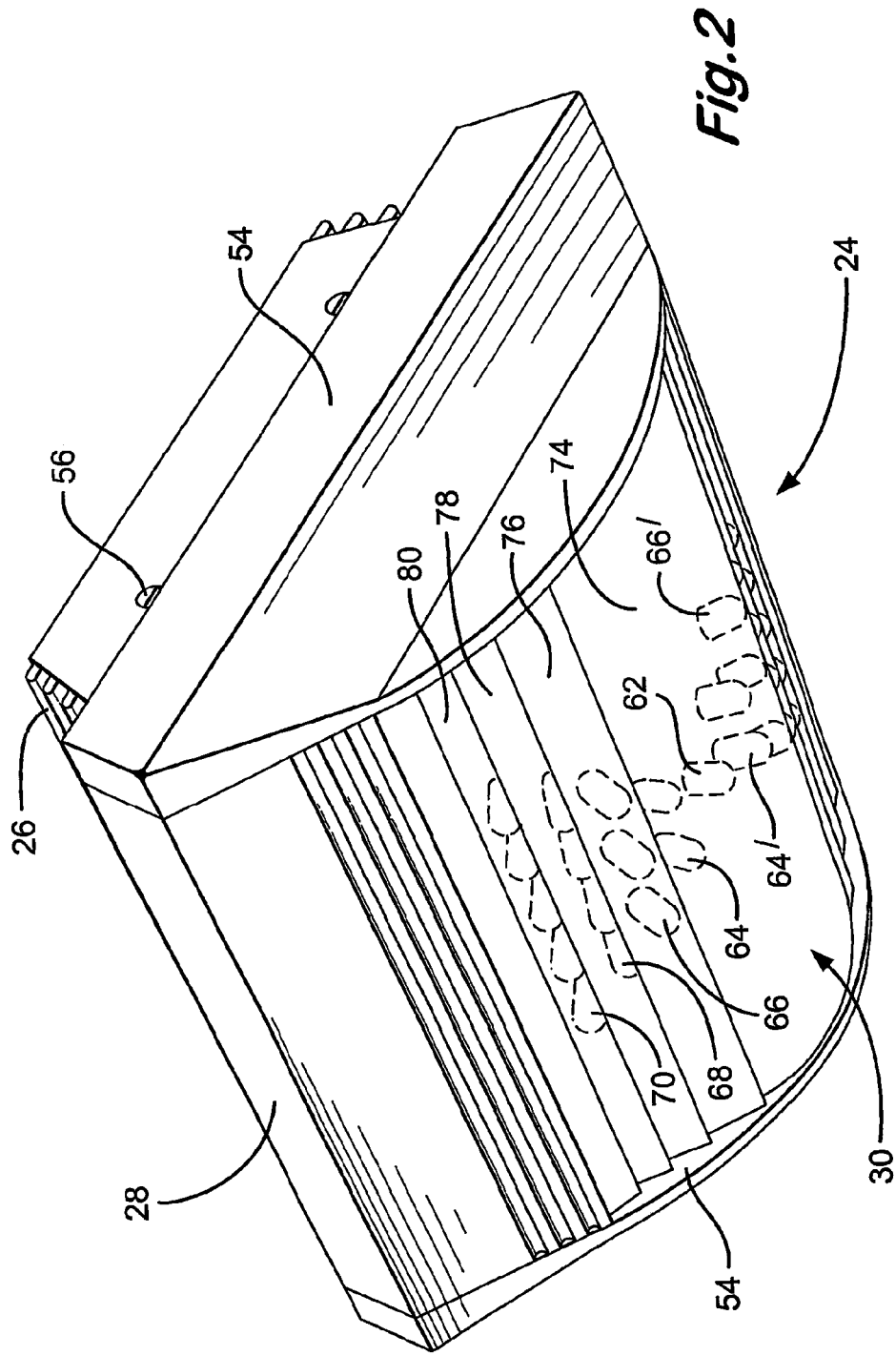
FIG. 2 is a perspective view from underneath of one of the luminaires to be fitted along an escape path as shown in FIG. 1.
Figure 3:
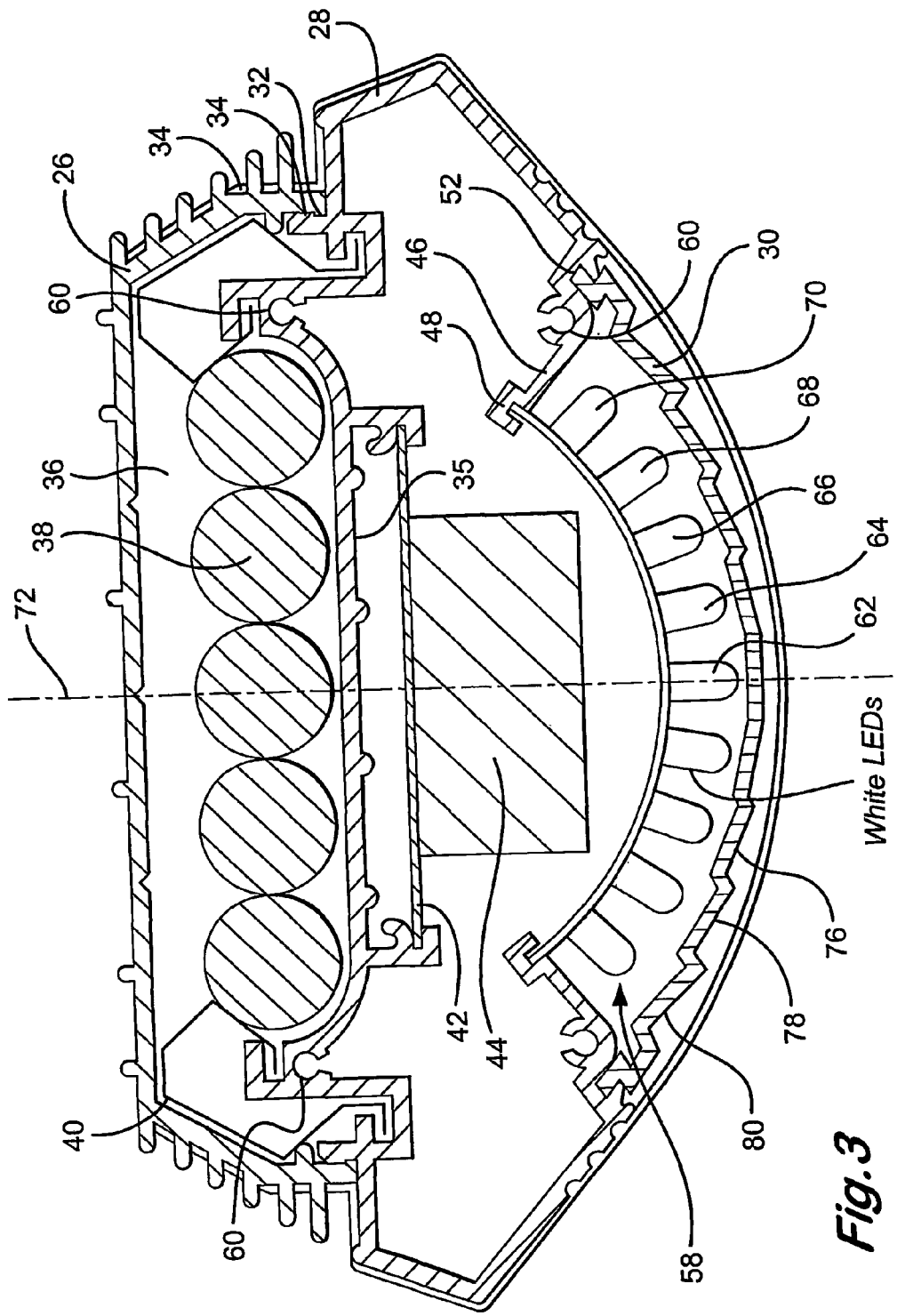
FIGS. 3–6 are respectively a longitudinal vertical section, a side view, an end view and an underneath view of the luminaire of FIG. 2.
Figure 4:
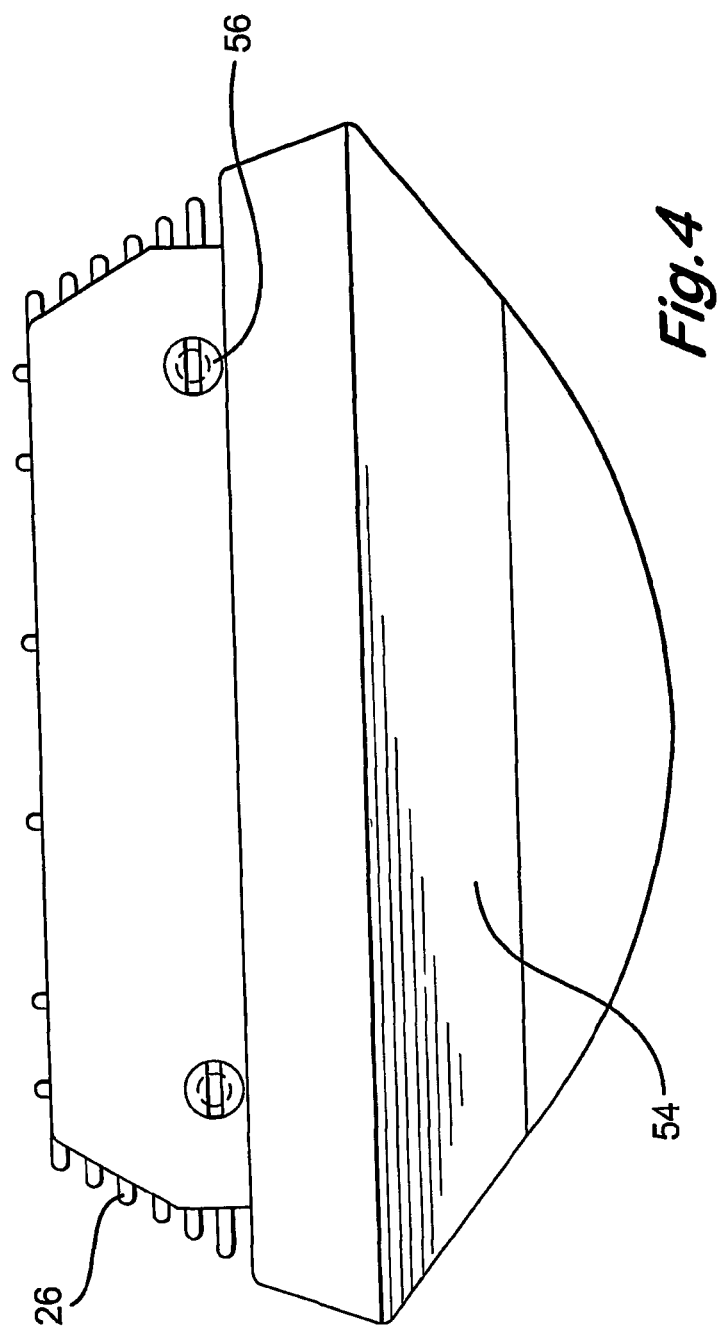
Figure 5:
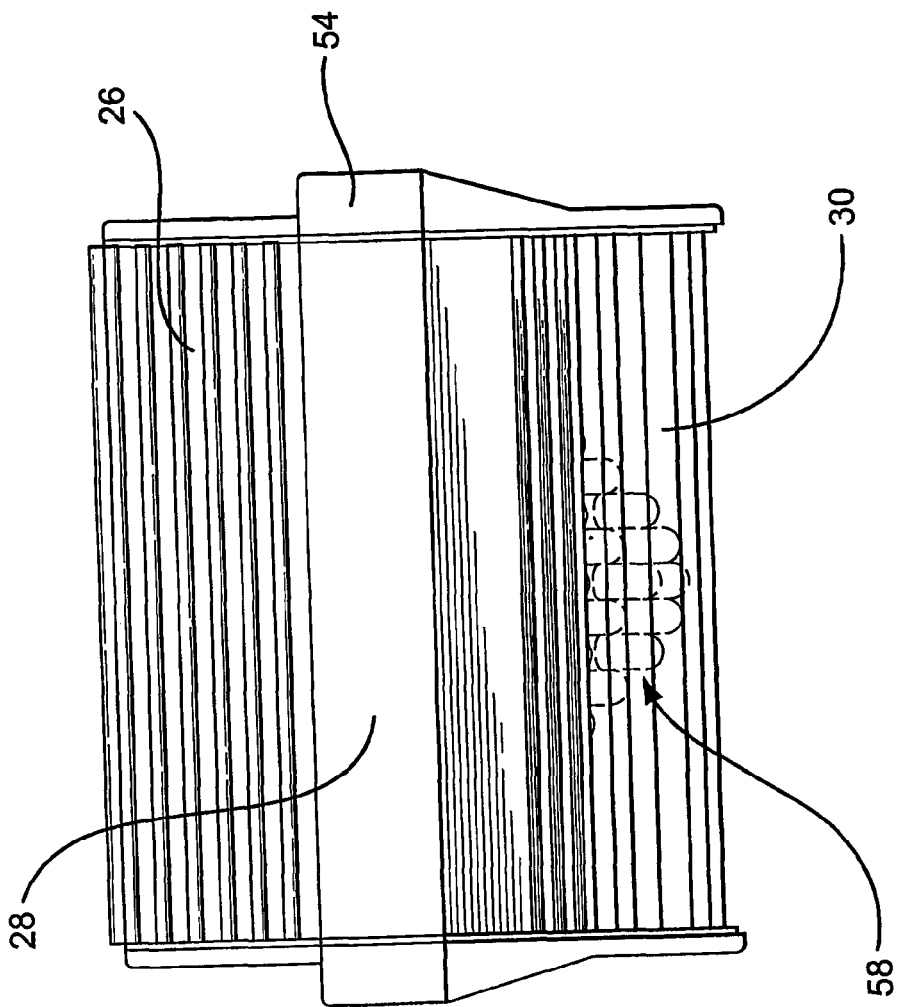
Figure 7:
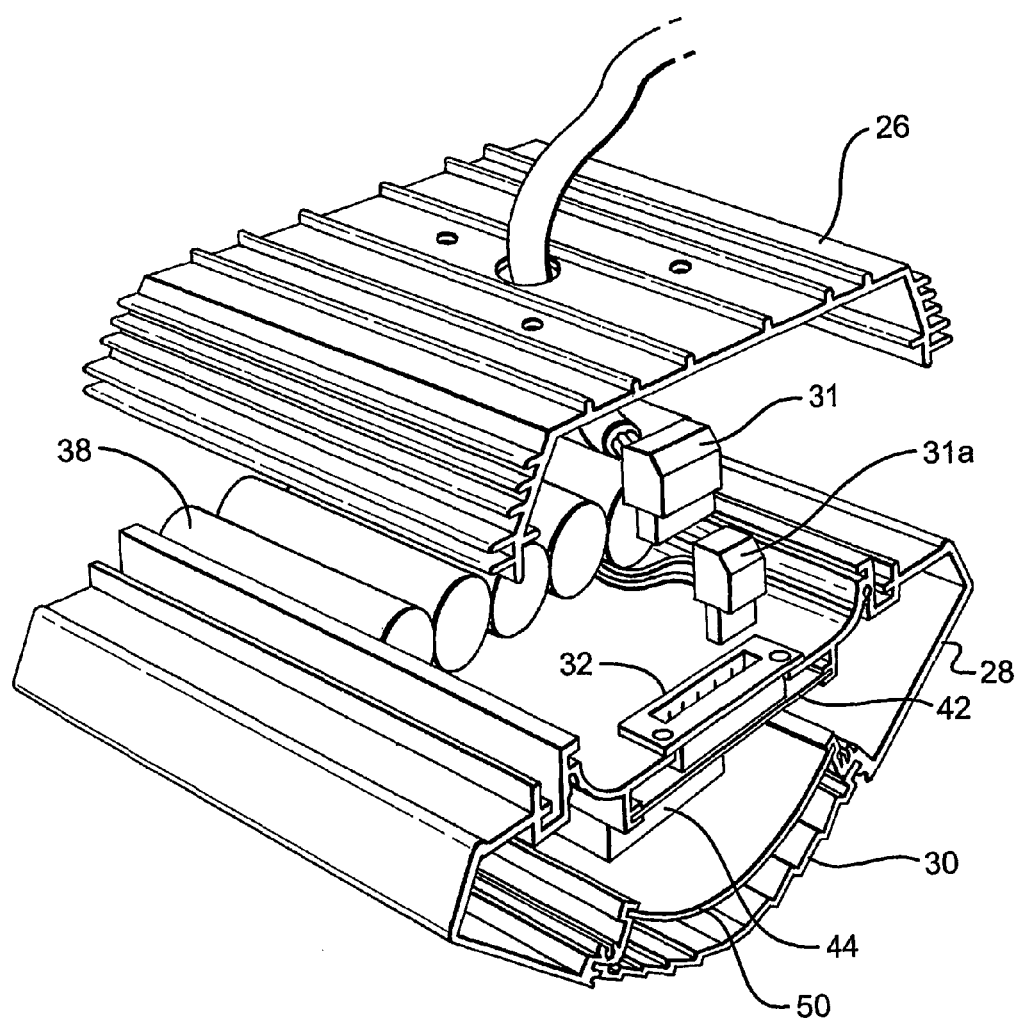
FIG. 7 is a perspective view of the luminaire from above with an upper part of the luminaire exploded from the lower part to reveal a battery compartment.

Referring now to FIG. 2, a luminaire 24 according to a first embodiment of the invention for surface mounting in a ceiling or for mounting in an aperture or recess formed in the ceiling comprises a holder 26 for fixing to or into the ceiling, a body 28 that is a snap fit or is otherwise removably attached to the holder 26 and a lens 30 forming part of the body 28. As is apparent from FIG. 3, the holder 26 is generally of channel section with end caps and it may be of extruded aluminum or other suitable material. Inner edge surfaces 32 are provided for snap engagement with mating surfaces 34 of the body 28 also of extruded aluminum or other suitable material. A web portion 35 of the body is spaced from the holder 26 to define a compartment 36 for batteries 38 that are held in position by spring clips 40. The batteries 38 may be nickel metal hydride cells for maintaining reliable emergency operation without the problems of discharge memory effect; nickel cadmium batteries could also be used. The intelligent electronics built into the lamp may provide for controlled charging and discharging of the cells 38 to achieve optimum life and performance for the batteries 38. A lower face of the web portion 35 supports a motherboard 42 on which is mounted a transformer 44 and other power supply and control circuitry. As shown in FIG. 7, the holder 26 carries first electrical connectors 31, 31a that mate with a second electrical connector 22 on the lamp body when the holder and body are fitted together for supply of mains and battery power to the motherboard 42 and also for providing charging current to the batteries 38 during quiescent or non-emergency conditions. Return flanges 46 of the body 28 are formed at their ends 48 with slots to receive a flexible fiberglass circuit board 50 that assumes a convex arcuate profile and carries an array of LEDs generally indicated by the reference numeral 58 on its lower face. The board 50 is of thickness about 0.5 mm and is single-sided with printed conductors on the face opposite to that to which the LEDs are attached. In the lamp shown, the board 50 becomes bent to a radius of curvature of about 45 mm. Further slots 52 provide a location for the lens 30 which has a radius of curvature of 60 mm. The ends of the body are closed by plates 54 which are attached to the body 28 by any convenient means, e.g. by screws 56 that locate in fixing channels 60. The plates 54 close off the ends of both the body 28 and the holder 26.

Figure 6:
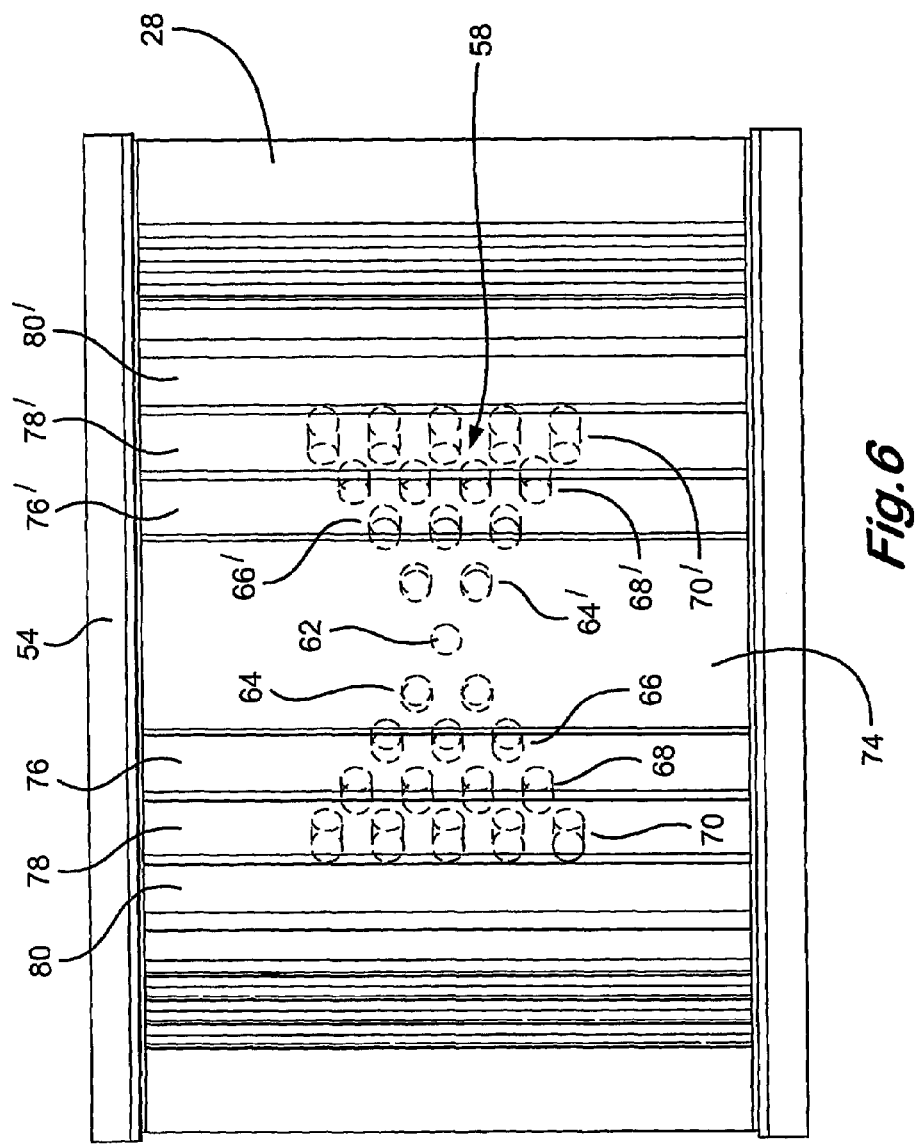

Referring to FIGS. 1 and 6, the diode array 58 is directed parallel to the longitudinal direction of the lamp and comprises a central red lensed LED 62 and rows 64,64', 66,66', 68,68', 70,70' of white lensed LEDs disposed symmetrically at progressively increasing distances from the LED 62 and respectively containing 2, 3, 4 and 5 LEDs. The LED 62 is provided to give a status indication, and the remaining white LEDs provide emergency illumination in a first mode and security lighting in a second mode as and when required. At the time of attachment of the LEDs to the circuit board 50, they are all parallel and normal to its surface, but when fitted into the luminaire, the white LEDs are inclined outwardly at angles that increase progressively with distance from the LED 62. If the array is defined to have an optical axis 72 (FIG. 3) that passes along a radius of the board 50 through the LED 62, then the working LEDs increase in number and in angle of outward inclination with distance from the optical axis. The diodes are spaced apart from one another in the array, with spacing between one diode and another in each row being 10 mm and the spacing between one row and another being 8.66 mm. The lamp may use InGaN (indium gallium nitride) white LEDs which can provide a long service life. In the embodiment shown, each white LED is a Nichia NSPW 510 BS lensed LED (available in the UK from plusOpto, Leigh, Lancs) that has a diameter of 5 mm, a length of 7 mm, a rated output of 1.1 candela and an output angle of 50° (i.e. the light is emitted as a divergent conical concentrated beam having a width of ±25° with respect to the optical axis of the LED).

Figure 11:
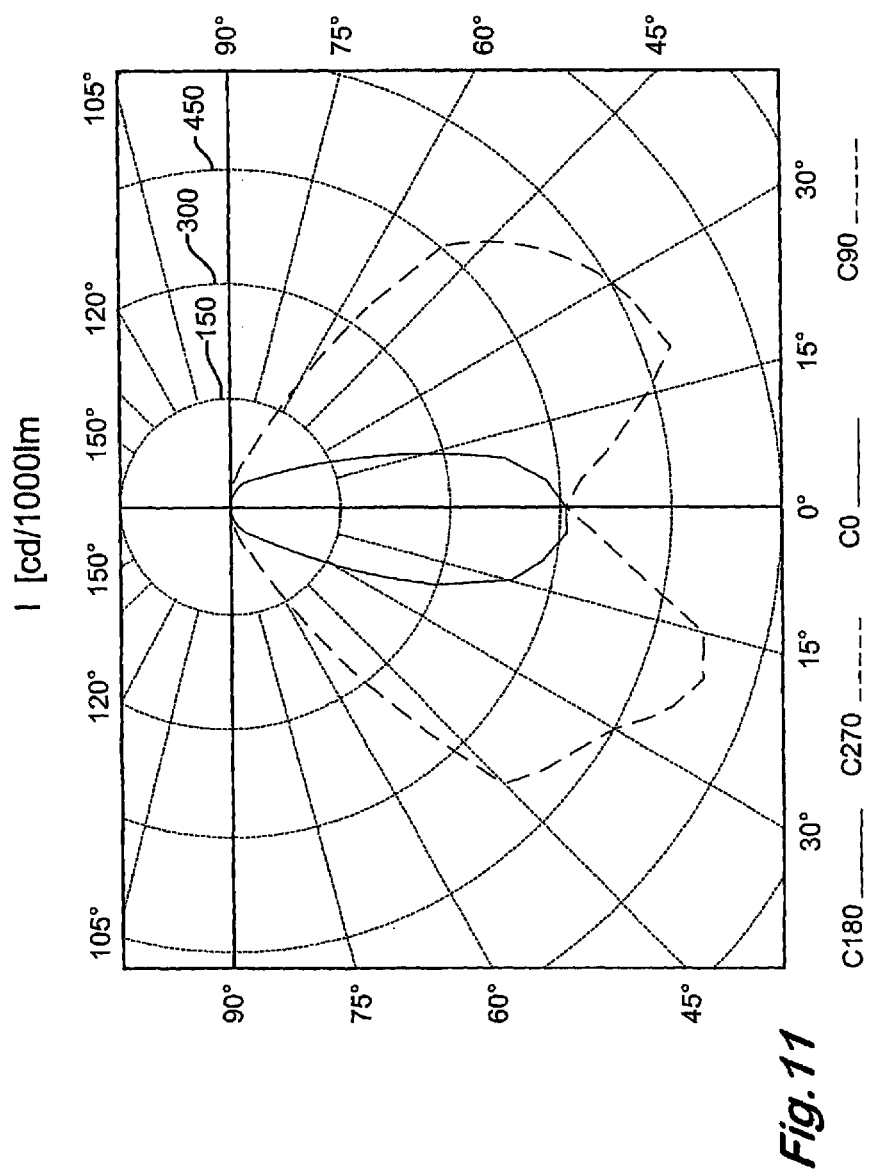
FIG. 11 is a graph showing longitudinal and transverse light intensity distributions for the luiminaire of FIGS. 2–10.

For attractive aesthetics of the luminaire, the lens 30 should have a larger radius of curvature than the circuit board 50, and in the present embodiment a radius of 60 mm has been selected. It is important to avoid waste of light from the LED's by back reflection from the lens 30 or through multiple reflections within the lens. The difference in curvature between the board 50 and the lens 30 creates few problems close to the optical axis 72, and for that reason the lens can have a plain curved axial region 74 through which light from the status indicator LED 62 and the working LEDs of the innermost rows 64,64' passes. Further from the optical axis the lens is formed with facets 76,76', 78,78', 80,80' through which light from the diodes in rows 66,66', 68,68', 70,70' passes, the facets being directed generally normal to the optical axes of the diodes in each row. Each facet is larger than the divergent beam from the LED impinging on it, so that the light from each LED passes through the facet with minimal deviation or reflection. Although the beam from each LED is relatively concentrated, it is possible to obtain even coverage over a wide field, with the greater intensity of emitted light being directed into the far field. The results obtainable with the above described are shown in FIG. 11 which is a plot of intensity [cd/1000 lm] against angle in the transverse (solid line) and axial (dotted lines) direction. In addition to good intensity on axis, it will be observed that a high intensity of illumination is obtained up to ±45° with respect to the optical axis.

Figure 8:
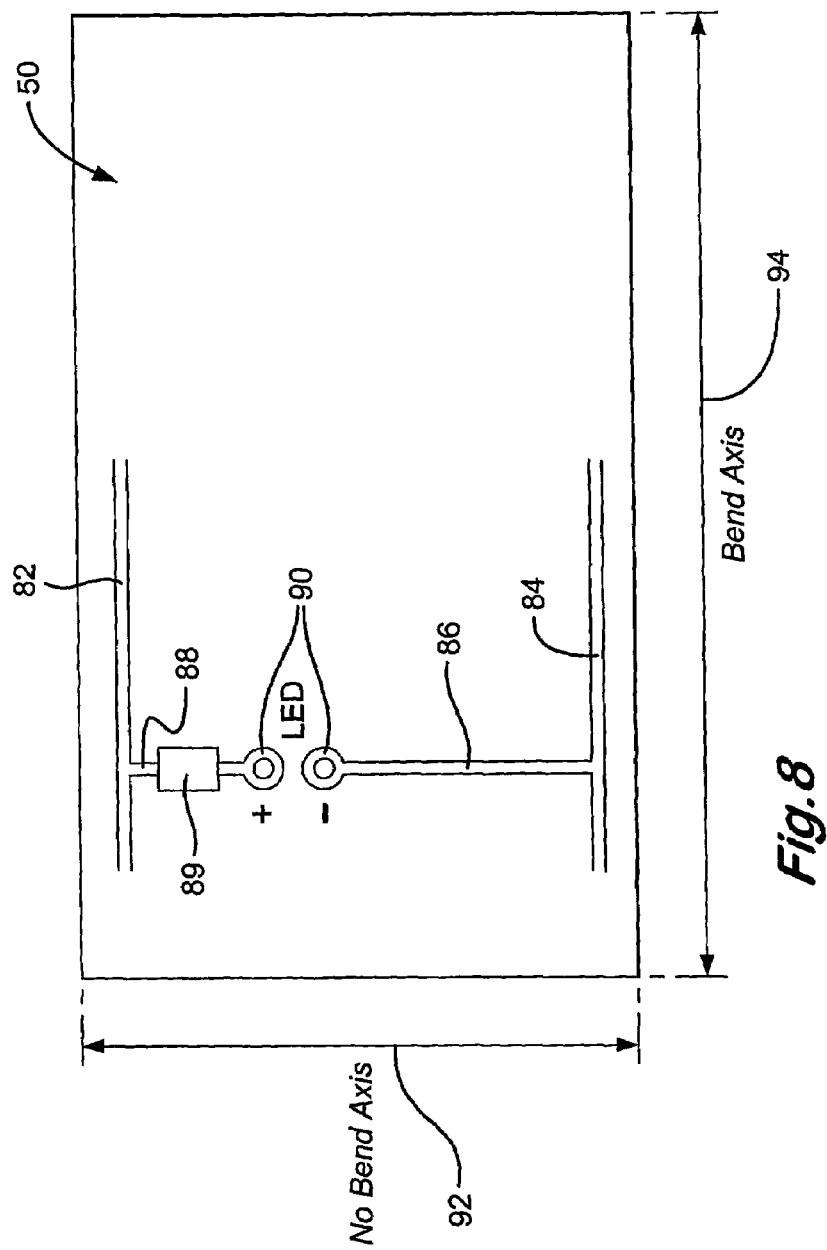
FIG. 8 is a diagrammatic plan view of a diode array circuit board showing conductors for one of the diodes in the array.
Figure 9:
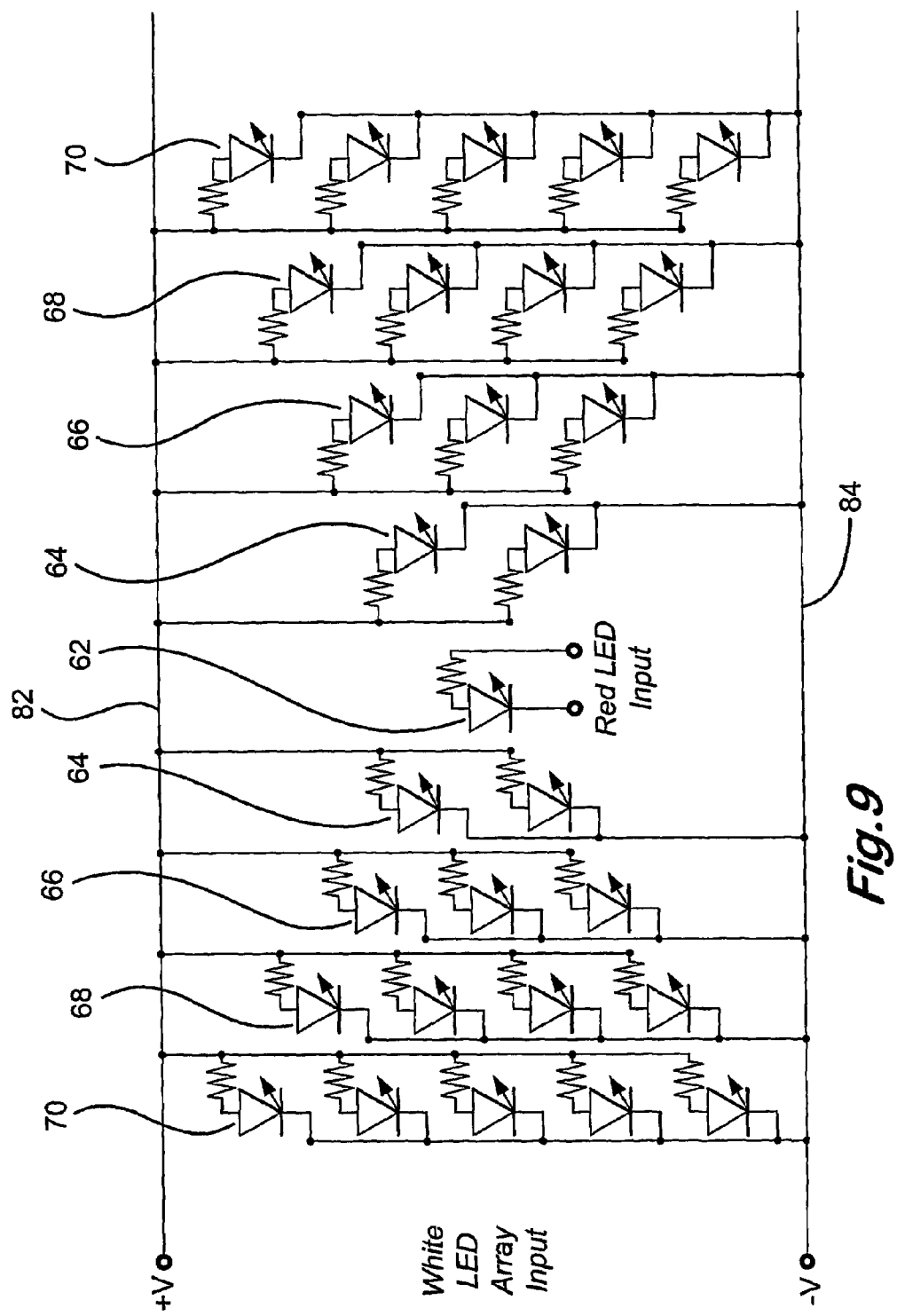
FIG. 9 is a circuit diagram for the LED array.

FIG. 8 shows the upper face of the circuit board 50 according to a first embodiment with longitudinal conductive tracks 82,84 between which are shown conductors 86,88 for a series resistor 89 and connector pads 90 for an LED. It will be noted that the conductors 86,88 and the surface mounted series resistor 89 are directed along the no-bend axis 92, whereas the tracks 82,84 are directed along the bend axis 94. This arrangement minimizes circuit faults arising when the board 50 is curved to the shape shown in FIG. 3. The circuit diagram of the board 50 with its current-limiting resistors and LEDs is as shown in FIG. 9. It will be noted that all the working LEDs are connected in parallel so that failure of any diode leaves the others still working. It may be desirable to avoid thermal interaction between the resistors and the LEDS. For that purpose a layout may be adopted in which the load resistors 89 are located on or adjacent to the tracks 82,84 and the LEDs are spaced from the tracks 82,84. With this arrangement the thermally sensitive LEDs are protected from the heat from the load resistors.

Figure 10:
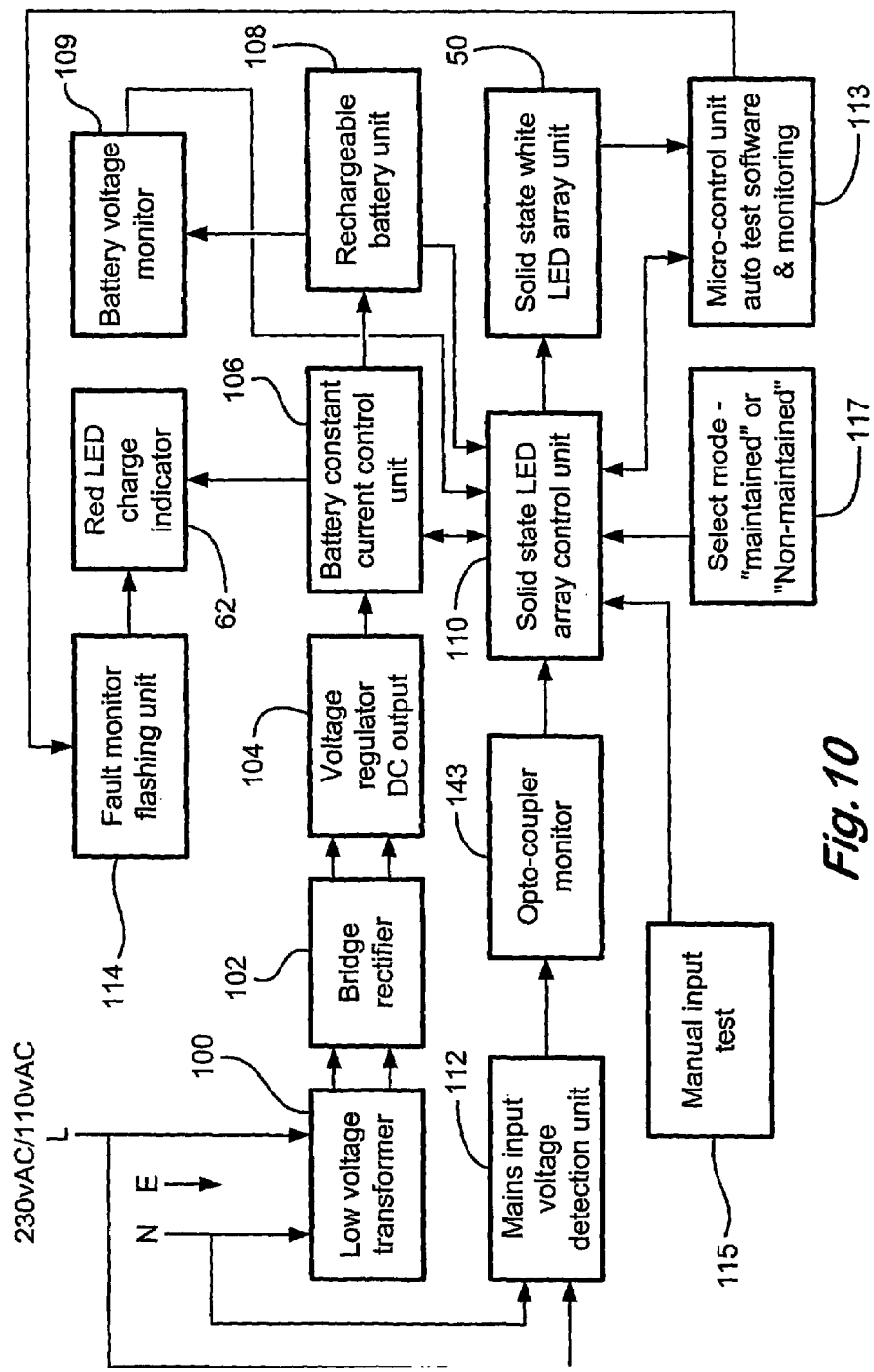
FIG. 10 is a schematic block diagram of a power supply and control circuit for the luminaire.

FIG. 10 gives schematic circuit of the driving and control circuitry. Mains AC is supplied via low-voltage transformer 100 to bridge rectifier 102 and the resulting low voltage DC output passes via voltage regulator 104 and battery constant current control unit 106 to the rechargeable battery unit 108 made up of the individual batteries 38 in space 36. During normal running this path maintains the batteries charged ready for use should an emergency arise. The mains input is also fed to an input voltage detection unit 112 whose output is fed through opto-coupler monitor 143 to a solid-state control unit 110 (e.g. a microcontroller). Assuming that power is present and the luminaire is operating correctly the control unit 110 causes the LED 62 to show a steady light. If, however there is a fault in the control circuitry, auto-test and monitoring software 113 activates flashing unit 114 to cause the LED 62 to flash. In an alternative arrangement instead of the red LED 62 there is provided a bi-color red/green LED that gives a constant green signal unless a fault is detected or the cells 38 are insufficiently charged, in which case it gives a flashing red signal. If power fails, the control unit 110 responds to a signal from the detection unit 112 by causing the control unit 106 to draw current from the battery unit 108 and to energize the white LEDs on the board 50. A manual input 115 can be used to cause a diagnostic test to be carried out, and maintained (lamp on with mains ON or OFF) or non-maintained (lamp OFF when mains ON) mode can be selected using a selector 117. In the maintained mode, emergency illumination and security illumination modes can be selected as described above. Battery voltage is monitored by monitor 109 that provides a feedback signal to the control unit 110 to enable the batteries to be maintained at the correct level of charge.

Light output from a practical embodiment of the lamp is shown in FIG. 11. As is apparent, the illumination is in two zones directed to opposite sides of the optical axis in a "bats-wing" configuration, and with the maximum intensity some 20° off the optical axis. The distribution and illumination levels achieved with this embodiment have been found to be sufficient for emergency lighting in shops, offices and other buildings.

Figure 12:
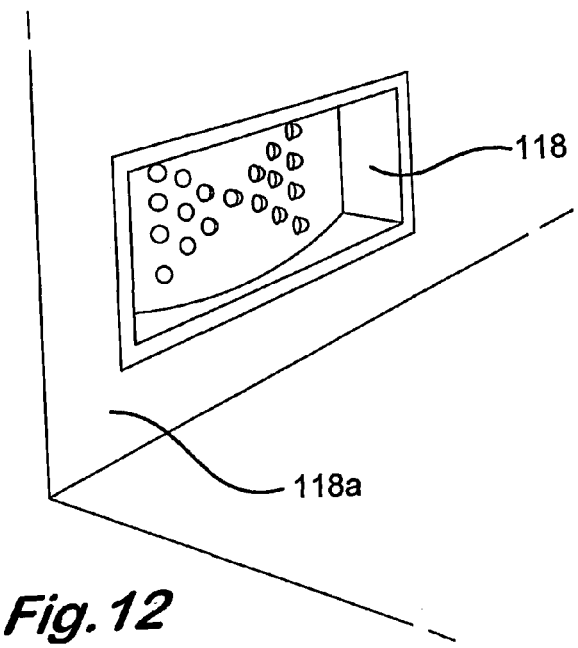
FIGS. 12 and 13 show the luminaire in alternative installation sites.
Figure 13:
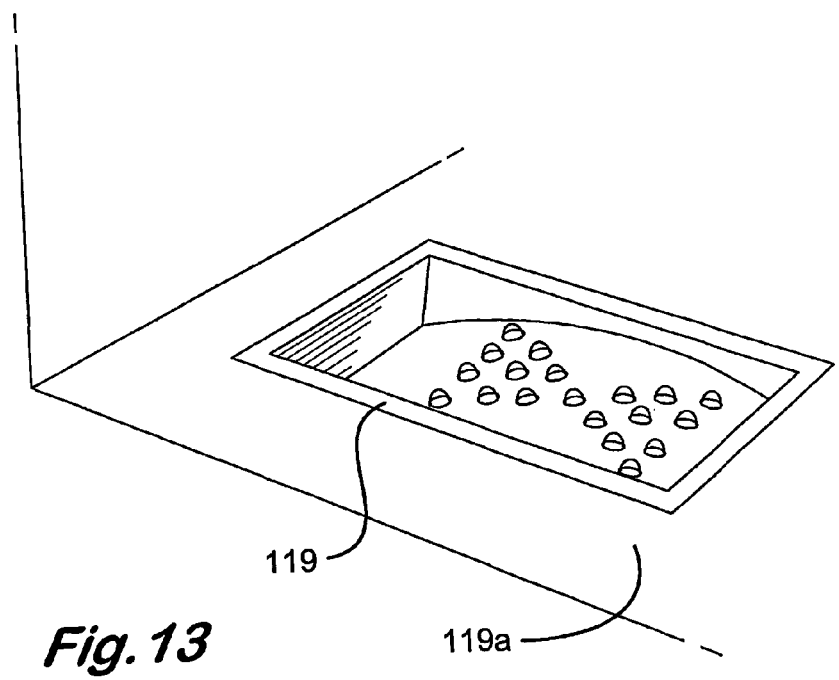
Figure 14:
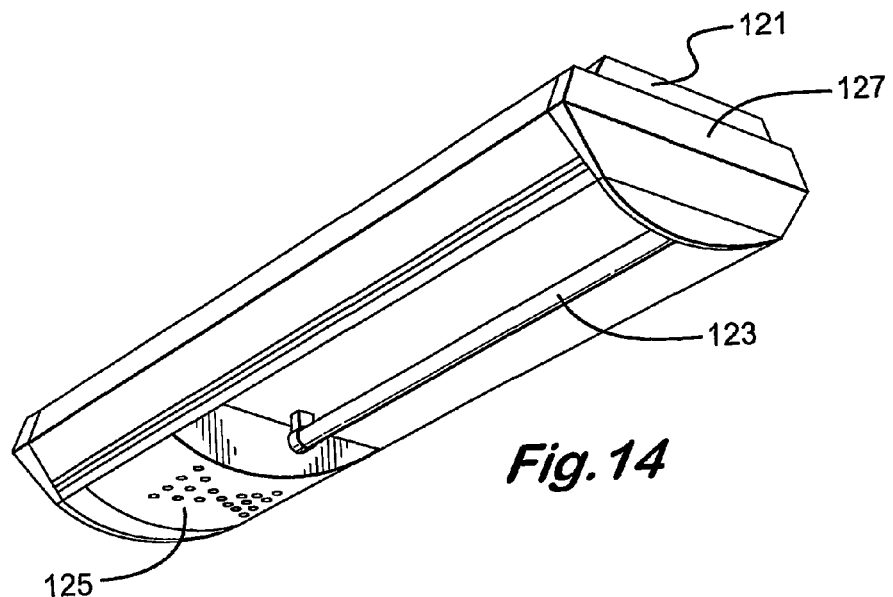
FIG. 14 shows a second embodiment of the invention in which a luminaire according to the invention is combined with a luminaire for providing general light.

Various modifications may be made to the luminaire described above without departing from the invention. Although it has been shown as ceiling mounted, it could be wall-mounted as is the luminaire 118 in wall 118a of FIG. 12 or an upright 119 mounted in floor 119a as shown in FIG. 13. Furthermore it can be combined with a general light luminaire that may have one or more incandescent lamps as its main source or one or more fluorescent lamps. In FIG. 14, a luminaire 121 comprises a fluorescent tube lamp 123 and a LED luminaire 125 of the general type previously described built in side-by-side relationship into a single housing or unit 127.

Figure 15:
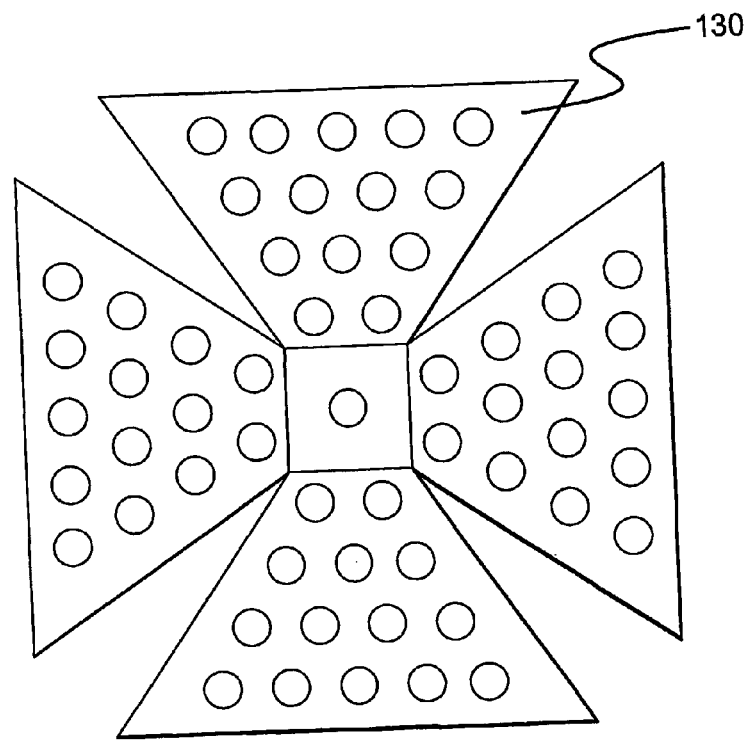
FIGS. 15 and 16 are respectively a plan view of a circuit board for a third embodiment of the invention before fitting of the diodes and a perspective view of the board with diodes in place and folded.
Figure 16:
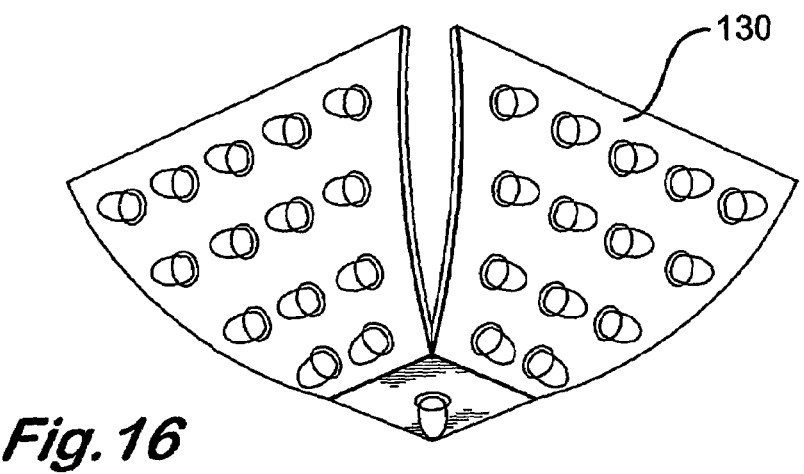
Figure 17:
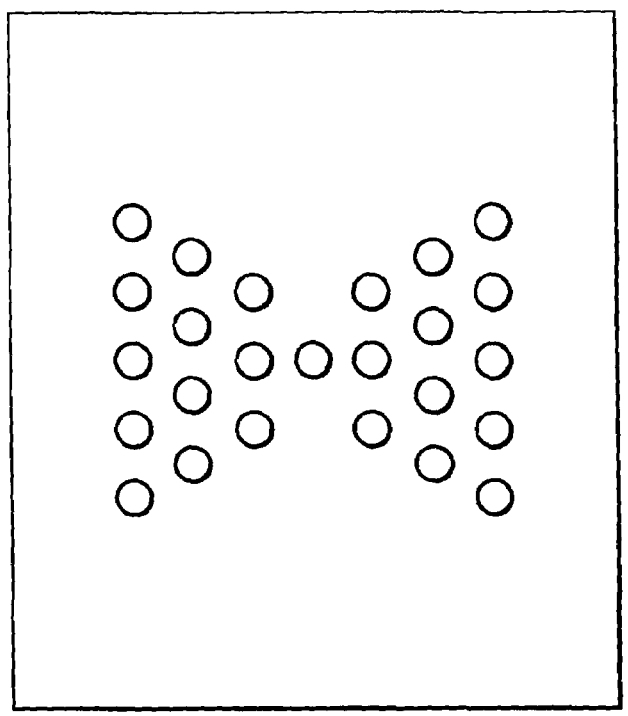
FIG. 17 shows diagrammatically a circuit board for a fourth embodiment of the invention having an alternative diode array.
Figure 18:
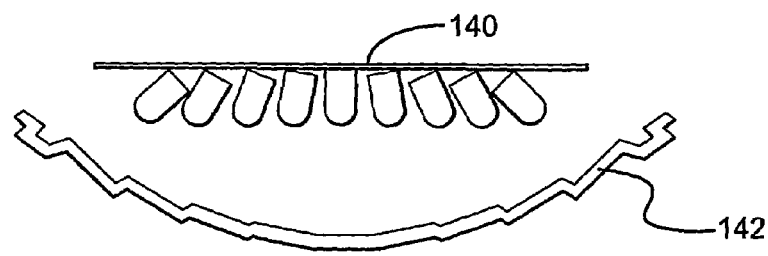
FIGS. 18 and 19 show diagrammatically a support and lens array for fifth and sixth embodiments of the invention.
Figure 19:
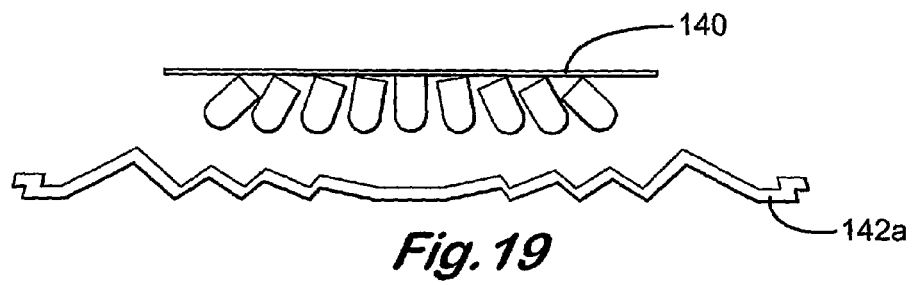

As shown in FIGS. 15 and 16, the circuit board 130 may be curved along two axes to provide a bi-axial light output, or it could be part spherical. The LED array need not nave the number of diodes indicated, and as shown in FIG. 17, for example, it may have rows of three, four and five diodes. In order to provide a more closely planar front face e.g. to be less conspicuous when the luminaire is ceiling-mounted, the diodes may be built into facets of an otherwise generally planar support 140 with a curved front lens 142 as shown in FIG. 18 or with an appropriately revised planar or near planar faceted lens 142a as shown in FIG. 19.

Figure 20:
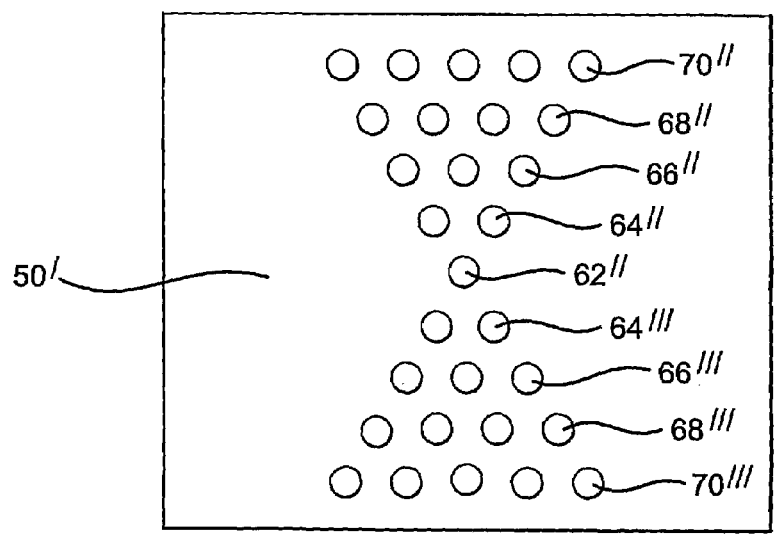
FIG. 20 shows a further diode array.
Figure 21:
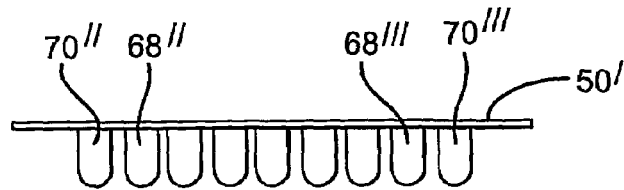
FIG. 21 shows a circuit board carrying the array of FIG. 20 in an un-folded state.
Figure 22:
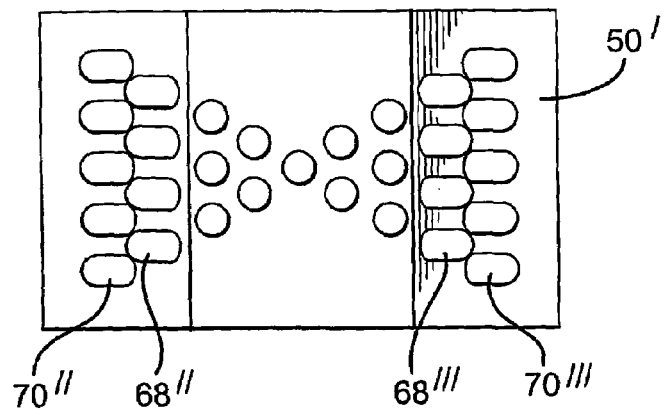
FIG. 22 is an underneath view of the array showing fold lines and FIG. 23 is a side views of the array in folded state.
Figure 23:
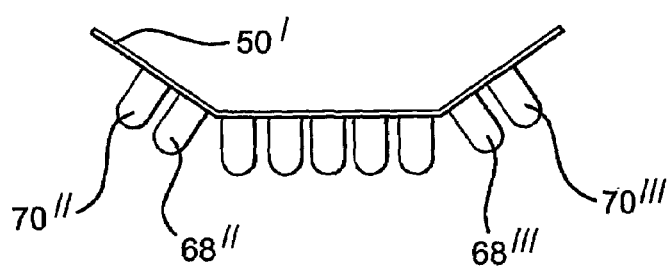
Figure 24:
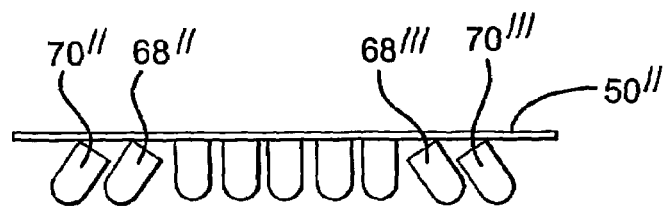
FIGS. 24 and 25 are side and underneath views of an alternative form of the array of FIG. 22 in which the support remains planar and outer rows of diodes are inclined.
Figure 25:
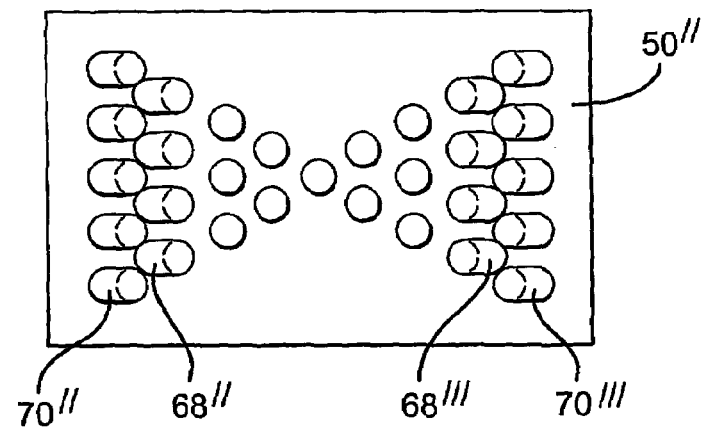
Figure 26:
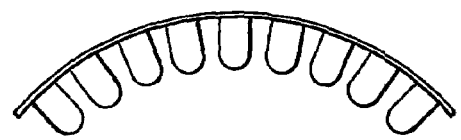
Figure 27:
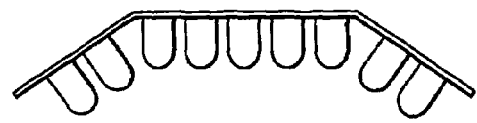

In FIG. 20 there is shown diagrammatically a circuit board 50' carrying a further LED array having a central LED 62' and rows of diodes 64", 64'", 66", 66'", 68", 68'", 70", 70'" having 2, 3, 4 and 5 diodes per row. FIGS. 21–23 show the board of FIG. 20 with outer regions plane folded to direct light from the outer rows of diodes 68", 68'", 70", 70'" to the far field as shown. In the variant of FIGS. 24 and 25, the board 50" remains planar and the diodes 68", 68'", 70", 70'" of the outer two rows are mounted in outwardly facing orientations to direct light into the far field as shown. As shown in FIG. 26, the LED support can be concavely curved in profile when installed into the luminaire with the LEDs on the inner face and FIG. 27 is a view similar to that of FIG. 26 except that the outer regions of the board are folded or faceted instead of curved. The advantage of using a concave array is that the aperture required in the ceiling or in the housing of a luminaire can be smaller than with the convex arrangement and without obstruction by the housing of the light emitted from the LEDs. In FIG. 28 the array is as shown in FIG. 6 and comprises green/red LED 62"" and white LEDs 64"", 66"", 68"" and 70"". There are added to the periphery of the array additional path-indicating LEDs 145 of a contrasting color to the white LEDs, e.g. green LEDs.

Figure 30:
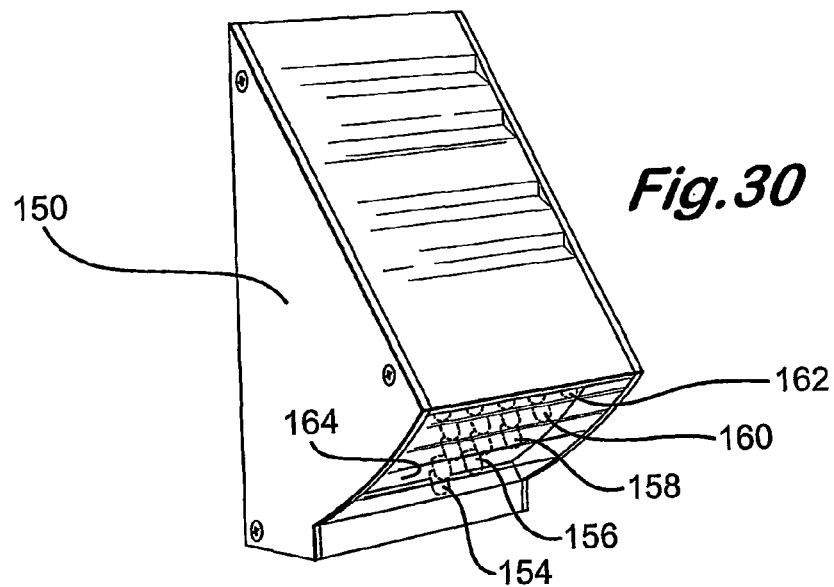
FIG. 30 is a front perspective view of the luminaire and FIG. 31 is a perspective view of the luminaire of FIG. 30 and of an illuminated sign depending therefrom.
Figure 31:
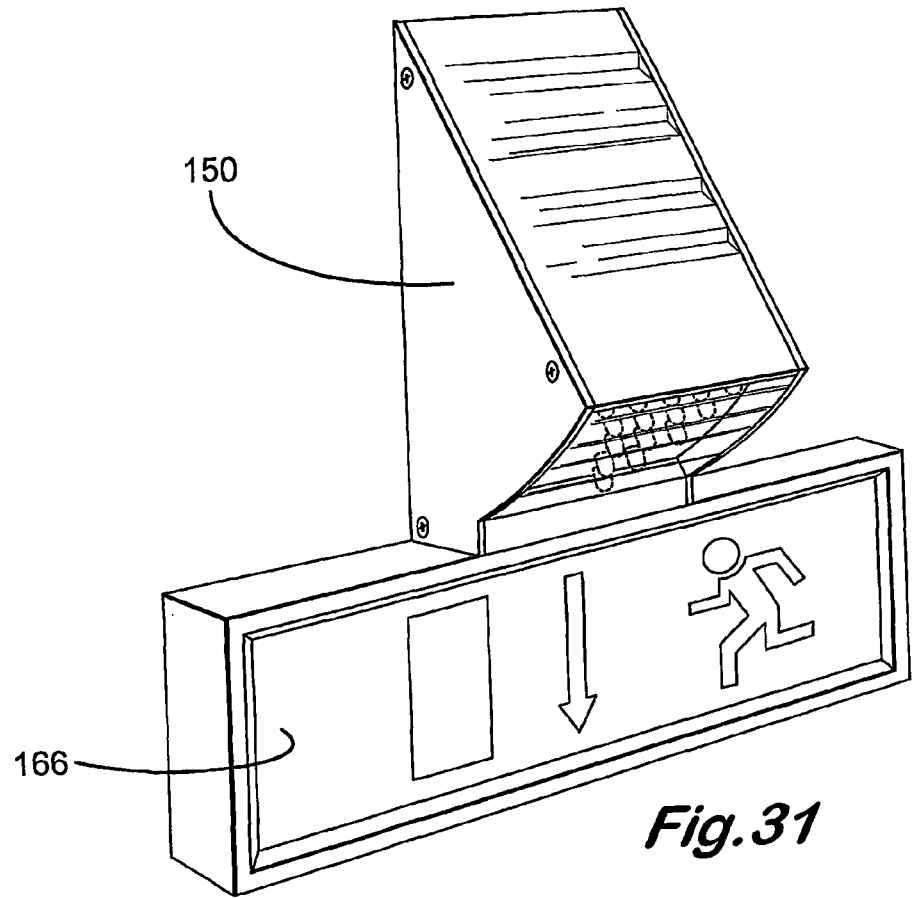

FIG. 29 shows a luminaire 24 as described with reference to FIGS. 2–11 mounted on ceiling 151 and a door opening 152 provided with downwardly facing LED-based downlighters 150. Each downlighter effectively has half the optics of a downlighter 24, that is to say a red/green status LED 154 and rows of 2, 3, 4 and 5 white LEDs marked 156, 158, 160 and 162, all behind a lens 164 whose profile is one half of the lens 30 as shown in FIG. 30. The downlighters 150 are shown wall-mounted but they could also be ceiling-mounted adjacent to the door opening 152. As shown in FIG. 31, the lower face of one of the downlighters 150 also supports a depending illuminated information panel 166.

In FIG. 32, a diode array on a planar circuit board 171 comprises a central red/green LED 170 and rows 172, 172", 173, 173', 174, 174' and 175, 175' whose number increases progressively with distance from the central LED 170 as for the array of FIG. 6. In this instance however, all the LEDs are mounted substantially parallel and facing substantially at right angles away from the board 171. A fresnel lens comprises a central region 176 that passes the light undeviated or with slight deviation, and facets 177, 177', 178, 178' and 179, 179' that are arranged to collect the light from diodes in rows 173, 173', 174, 174' and 175, 175' and direct it at progressively increasing angles towards the far field.

What is claimed is:

1. A light-emitting diode lamp comprising a support and an array of light emitting diodes on the support, the light-emitting diode lamp having an optical axis, wherein:

diodes in the array increase in number in a first direction with increasing distance from the optical axis in a second direction, the second direction being at right angles to the first direction; and the propagation direction of light from at least some of the diodes increases in inclination to the optical axis with increasing distance of the diode from the optical axis in the second direction, thereby providing substantially uniform illumination within a plane lying at right angles to the optical axis.

2. The lamp of claim 1, wherein the diodes are arranged in an array so that their light produces a single lobe of illumination inclined to the optical axis.

3. The lamp of claim 1, wherein:

diodes in the array increase in number in the first direction with increasing distance from the optical axis in a third direction, the third direction at 180 degrees to the second direction about the optical axis; and the propagation direction of light from at least some of the diodes increases in inclination to the optical axis with increasing distance of the diode from the optical axis in the third direction.

4. The lamp of claim 3, wherein the diodes are arranged in an array so that their light produces first and second lobes of illumination inclined to the optical axis and at 180 degrees to one another about the optical axis.

5. The lamp of claim 3, wherein:

diodes in the array increase in number in a fourth direction with increasing distance from the optical axis in a fifth direction, the fourth direction being at right angles to the first direction; and the propagation direction of light from at least some of the diodes increases in inclination to the optical axis with increasing distance of the diode from the optical axis in the fifth direction.

6. The lamp of claim 5, wherein:

diodes in the array increase in number in the fourth direction with increasing distance from the optical axis in a sixth direction, the sixth direction being at 180 degrees to the fifth direction about the optical axis; and the propagation direction of light from at least some of the diodes increases in inclination to the optical axis with increasing distance of the diode from the optical axis in the third direction.

7. The lamp of claim 6, wherein the diodes are arranged in an array so that their light produces first and second lobes of illumination inclined to the optical axis and at 180 degrees to one another about the optical axis and third and fourth lobes of illumination inclined to the optical axis and at 180 degrees to one another about the optical axis, the inclination of the third and fourth lobes being at right angles to the first and second lobes about the optical axis.

8. The lamp of claim 1, wherein the increase in inclination of the light propagation direction results from the passage of the light through respective lens facets of progressively increasing inclination to the optical axis with increasing distance from the optical axis in the second direction.

9. The lamp of claim 1, wherein the increase in inclination of the light propagation direction results from an increasing inclination of the at least some diodes to the optical axis with increasing distance of the diodes from the optical axis in the second direction.

10. The lamp of claim 9, wherein the support is generally planar and the diodes are carried on inclined faces forming part of the support.

11. The lamp of claim 9, wherein the support is concave and the diodes are on at least one of the inner face and the outer face.

12. The lamp of claim 11, wherein the support is of flexible material.

13. A luminaire comprising a lamp as claimed in claim 9 and a lens having facets for passage of light from off-axis diodes generally un-deviated and un-reflected.

14. The luminaire of claim 13, further comprising storage batteries for supplying current to the diodes, a charging circuit for charging the batteries from mains power and a control circuit for switching battery power to the diodes on loss of mains power.

15. The luminaire of claim 14, further comprising at least one additional source of light.

16. The luminaire of claim 15, wherein the at least one additional source of light is at least one incandescent lamp.

17. The luminaire of claim 15, wherein the at least one additional source of light is at least one fluorescent tube.

18. A building emergency lighting system comprising luminaries as claimed in claim 13.

19. The lighting system of claim 18, wherein means provides control of the luminaries for operation in a first mode to provide emergency lighting and in a second mode to provide continuous security lighting.

20. The lighting system of claim 19, wherein said control means causes diodes to operate at a first power during emergency lighting and at a second power less than the first power during security lighting requiring reduced light output.

21. The lamp of claim 1, wherein the diodes are lensed.

22. The lamp of claim 21, wherein the diodes have an output in the form of a concentrated beam of angle of about ±25° with respect to their optical axes.

23. The lamp of claim 1, wherein the diodes are at spacings one from another.

24. The lamp of claim 1, wherein the support carries an electrical circuit for supplying power to the diodes, the diodes being connected in parallel.

* * * * *